United States Patent [19]

Barnes

[11] 4,003,776
[45] Jan. 18, 1977

[54] METHOD OF FABRICATING A DEMOUNTABLE ROD

[75] Inventor: Richard D. Barnes, Costa Mesa, Calif.

[73] Assignee: The Conolon Corporation, Santa Ana, Calif.

[22] Filed: June 18, 1974

[21] Appl. No.: 480,380

[52] U.S. Cl. .............................. 156/242; 156/257; 156/258; 156/289; 156/294; 156/304; 264/157; 264/242; 264/249; 264/264; 264/267; 264/296

[51] Int. Cl.² .................. B29D 3/02; B29C 17/08

[58] Field of Search .......... 264/242, 213, 249, 259, 264/267, 264, 269, 300, 265, 296, 36, 157, 138, 145, 162; 144/309 R, 310 R, 313, 314 R; 29/450, 425, 525, 416, 525; 43/18 R, 18 GF; 403/361, 165, 268, 269, 301, 305, 300; 156/159, 158, 172, 173, 242, 289, 304, 293

[56] References Cited

UNITED STATES PATENTS

| 3,048,432 | 8/1962 | Harter | 43/18 R |
|---|---|---|---|
| 3,152,820 | 10/1964 | Giampa et al. | 403/305 |
| 3,469,338 | 9/1969 | Hills | 403/300 |
| 3,830,008 | 8/1974 | Johnson | 403/361 |

FOREIGN PATENTS OR APPLICATIONS

| 1,186,861 | 4/1970 | United Kingdom | 43/18 |

OTHER PUBLICATIONS

Randolph et al., *Plastics Engineering Handbook*, Reinhold, N.Y. (1960), pp. 180, 181, 287–289, 297, 298 relied on.
Parr, *Machine Tools and Workshop Practice*, Longmans, Green & Co., N.Y. (1905), pp. 12–14 relied on.

*Primary Examiner*—Willard E. Hoag

[57] ABSTRACT

A demountable fishing rod is formed as a single tapering tube with a thick walled central portion, the tube is cut in two at the large end of the thick walled central portion to form a butt portion and a tip portion, the thick walled central portion is sized to receive a cylindrical sleeve which is glued over the sized portion to extend rearwardly beyond the tip portion, the tapering small end of the butt portion is sized and coated with a mold release agent, the sleeve has a molding material inserted therein, and the tapered end of the butt is held in the sleeve while the molding material hardens to provide a demountable joint.

5 Claims, 9 Drawing Figures

METHOD OF FABRICATING A DEMOUNTABLE ROD

BACKGROUND OF THE INVENTION

In the manufacture of fiberglass tubes for use as fishing rods, it is difficult and costly to fabricate rod sections having tapered sleeves and plugs to enter the sleeves to provide a connection for a demountable rod. The process of this invention forms a superior demountable rod at less cost.

SUMMARY OF THE INVENTION

A demountable fishing rod is formed by fabricating a tapered fiberglass tube with a central externally thickened portion. The tube is cut at the larger end of the thickened portion to form a tapered butt portion and a tip portion having the thickened portion at its large end. A cylindrical fiberglass tube is formed of substantially the same outside diameter as the thickened portion and sleeves are but therefrom. The rear end of the thickened portion is machined, ground, or otherwise sized to receive a sleeve thereover. A sleeve is glued or otherwise fixed on the sized portion of the thickened portion to extend rearwardly from it. The tapering front end of the butt portion is finished in a smooth taper and then coated with a release agent. A molding material is inserted in the projecting portion of the sleeve and the tapered end of the butt portion is inserted and held in the sleeve while the molding material hardens to form a demountable joint. Upon removal of the tapered end of the butt from the sleeve, a small part of the end of the butt may be cut off so that the tapered end of the butt may always be jammed tightly into the sleeve taper formed by the molding material.

Since the sleeve is cut with many others from a cylindrical fiberglass tube, the sleeve is relatively inexpensive to fabricate compared to any other type of tapered sleeve. Further, since the outside diameter of the sleeve may be substantially the same as the outside diameter of the thickened portion, the joint has a smooth, aesthetically pleasing appearance. This method of construction also provides a very strong and light demountable joint. Since all the elements are fabricated of fiberglass, there is no danger of corrosion as there is with conventional metal parts. Many other advantages arise from the process of this invention.

DESCRIPTION OF THE PREFERRED EMBODIMENT

Figure 1:
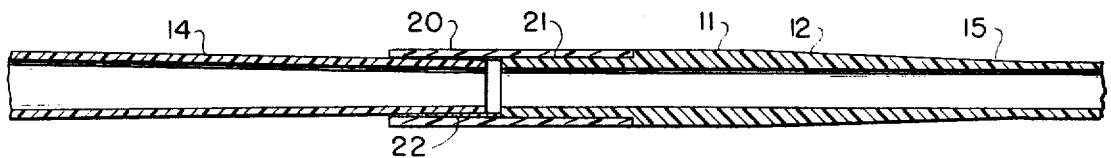
FIG. 1 is a longitudinal section through broken away butt and tip portions of a rod demountably joined by a connection formed according to the method of this invention.
Figure 2:
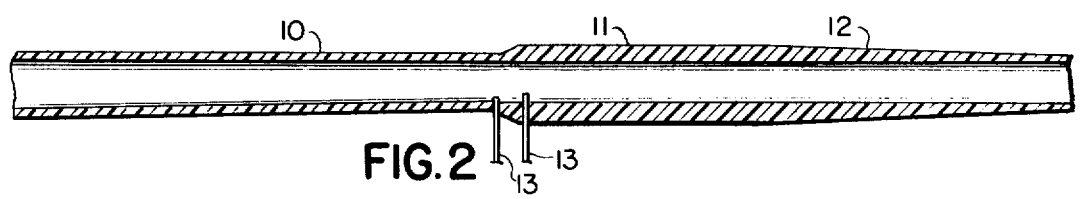
FIG. 2 is a longitudinal section through a broken away center of a tapered fiberglass tube having a thickened central portion, the tube being shown being cut in two at the large end of the thickened portion.
Figure 3:
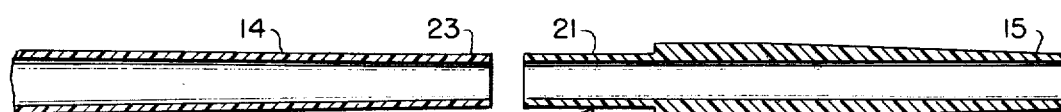
FIG. 3 is a longitudinal section through a broken away end of a butt portion cut from the tube of FIG. 2.
Figure 4:
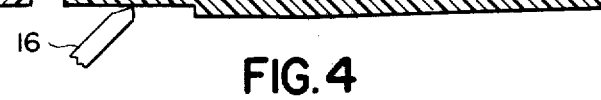
FIG. 4 is a longitudinal section through a broken away end of a tip portion cut from the tube of FIG 2, an enlarged portion of the tip portion shown being sized.

As shown in FIG. 2, a tapered fiberglass tube 10 is fabricated with an outwardly thickened wall portion 11 having a smoothly tapering front end 12. The tube 10 is cut by one or more saws 13 to provide the tapered butt portion 14 shown in FIG. 3 and the tip portion 15 shown in FIG. 4. The rear or larger end of the thickened wall portion 11 is sized by turning it against a suitable cutting tool 16 or in any conventional manner to provide the smaller diameter cylindrical surface 21.

Figure 5:
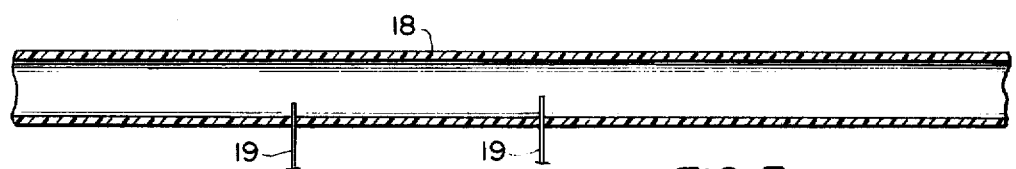
FIG. 5 is a longitudinal section through a fragment of a cylindrical length of tubing shown having a sleeve cut therefrom.
Figure 6:
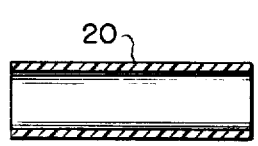
FIG. 6 is a longitudinal section through a sleeve cut from the tube of FIG. 5.
Figure 7:
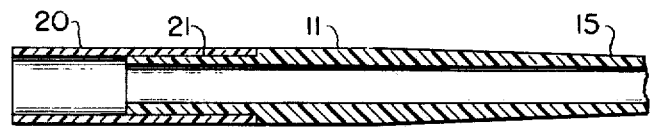
FIG. 7 is a longitudinal section through the broken away end of the tip portion of FIG. 4 with a sleeve fixed thereon.

As may be seen in FIG. 5, a cylindrical fiberglass tube 18 is fabricated to have a slightly larger inside diameter than sized surface 21. For best appearance, its outside diameter should be substantially the same diameter as the thickened wall portion 11. Saws 19 or the like cut lengths from tube 18 to form the sleeves 20 as shown in FIG. 6. The sized surface 21 of tip portion 15 is coated with a suitable glue or bonding agent and sleeve 20 is placed over it and thus fixed to extend rearwardly as shown in FIG. 7.

Figure 8:
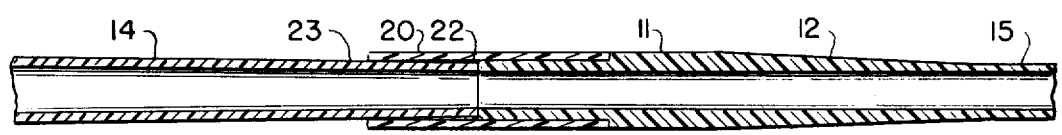
FIG. 8 is a longitudinal section through the broken away end of the butt portion of FIG. 3 inserted into molding material in the sleeve of the broken away tip portion of FIG. 7.
Figure 9:
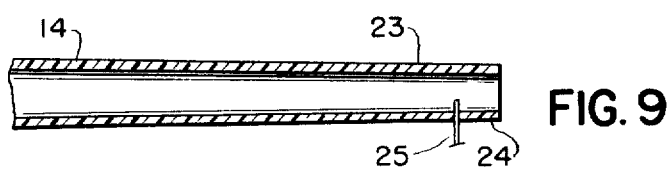
FIG. 9 is a longitudinal section through the broken away end of the butt portion of FIG. 3 shown having a small portion of its end being removed.

A molding material 22 is placed in the sleeve 20. The tapered end 23 of butt portion 14 is smoothed or finished to remove irregularities if required and it is coated with a release agent. The end 23 is then inserted in the sleeve 20 while the molding material 22 cures and hardens as may be seen in FIG. 8. When the butt portion 14 is pulled from sleeve 20, the sleeve 20 has molded within it a matching tapered opening to receive it. As shown in FIG. 9, a small end portion 24 may be removed by a saw 25 so that, even after wear, the butt 14 may be jammed tightly into sleeve 20. This method of construction provides a stronger and less costly demountable rod. If the outside diameter of the sleeve 20 is substantially the same as that of the enlarged portion 11, the completed tip 15 will have a smooth tapering shape.

While the butt and tip sections 14 and 15 are described as being elements of a demountable fishing rod, this invention may be used in the fabrication of other devices having demountable fiberglass tubular elements.

I claim:

1. The method of fabricating a demountable rod comprising the steps of:
    a. forming a tapered fiberglass tube having a thickened central portion with an outwardly thickened wall;
    b. cutting the tube in two at the large end of the thickened portion forming a tapered butt portion and a tip portion having the thickened portion at its large end;
    c. providing a cylindrical sleeve;
    d. sizing the large end of the thickened portion to receive the sleeve thereover;

e. fixing the sleeve on the sized end of the thickened portion with the sleeve projecting rearwardly therefrom;
f. coating the small end of the butt portion with a release agent;
g. placing a molding material in the sleeve; and
h. inserting the small end of the butt portion in the projecting end of the sleeve and allowing the molding material to harden forming a demountable joint.

2. The method of claim 1 wherein step (c) involves forming a cylindrical fiberglass tube and cutting a sleeve therefrom.

3. The method of claim 1 wherein step (f) involves smoothing the small end of the butt portion prior to coating it with a release agent.

4. The method of claim 1 with the additional step of:
i. removing the butt portion from the sleeve and cutting a small end portion from the butt portion.

5. The method of claim 1 wherein step (c) involves forming the sleeve with an outside diameter substantially the same as the thickened portion and step (a) involves forming the thickened portion with a smoothly tapering smaller end.

* * * * *